(12) United States Patent
Ozaki et al.

(10) Patent No.: US 7,832,383 B2
(45) Date of Patent: Nov. 16, 2010

(54) ENGINE AND PERSONAL WATERCRAFT

(75) Inventors: Atsufumi Ozaki, Kobe (JP); Keiji Takahashi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 209 days.

(21) Appl. No.: 11/725,155

(22) Filed: Mar. 15, 2007

(65) Prior Publication Data

US 2007/0215124 A1    Sep. 20, 2007

(30) Foreign Application Priority Data

Mar. 15, 2006 (JP) .............................. 2006-071471

(51) Int. Cl.
*F02B 33/00* (2006.01)
(52) U.S. Cl. ......................................... 123/564; 60/600
(58) Field of Classification Search ................. 123/528, 123/559.1–565; 60/597–612
See application file for complete search history.

(56) References Cited

U.S. PATENT DOCUMENTS 6,012,436 A * 1/2000 Boutcher .................. 123/559.1
7,404,293 B2 * 7/2008 Ozawa .......................... 60/611
2006/0016437 A1 * 1/2006 Ozawa .......................... 123/564

FOREIGN PATENT DOCUMENTS

| JP | 01-216022 | 8/1989 |
| JP | 2001-317421 A | 11/2001 |
| JP | 2003-026092 | 1/2003 |
| JP | 2006-002634 A | 1/2006 |

* cited by examiner

*Primary Examiner*—Thomas Denion
*Assistant Examiner*—Douglas J. Duff
(74) *Attorney, Agent, or Firm*—Alleman Hall McCoy Russell & Tuttle LLP (57) ABSTRACT

An engine for a personal watercraft that is equipped with a supercharging machine, including a pressure release device that is configured to, when a pressure in a region of an air-intake passage of the engine that is located upstream of a throttle valve in an intake-air flow direction exceeds a predetermined value, release the pressure outside the air-intake passage.

3 Claims, 9 Drawing Sheets

ENGINE AND PERSONAL WATERCRAFT

TECHNICAL FIELD

The present invention relates to an engine equipped with a supercharging machine, and a personal watercraft comprising the engine.

BACKGROUND ART

Some personal watercraft include therein an engine equipped with a supercharging machine such as a turbo charger or a supercharger. One example is disclosed in Japanese Laid-Open Patent Application Publication No. 2003-26092.

Since the supercharging machine is typically configured to compress air taken in from outside and to supply the compressed air to a throttle device such as a throttle body for controlling an amount of the air supplied to the engine, a pressure in a region of an air-intake passage that is located upstream of a throttle valve in an intake-air flow direction becomes higher than a pressure in a region of the air-intake passage that is located downstream of the throttle valve. If the pressure increases excessively, then a load is likely to be applied to the throttle device, decreasing durability of the throttle device.

In particular, during a partial load operation of the engine, i.e., operation in which the throttle valve is at an intermediate opening degree, the pressure tends to increase because the amount of air required in the engine is less.

SUMMARY OF THE INVENTION

The present invention addresses the above described conditions, and an object of the present invention is to provide an engine that is capable of suppressing an excess pressure increase in an air-intake passage of the engine, and a personal watercraft comprising the engine.

According to a first aspect of the present invention, there is provided an engine for a personal watercraft that is equipped with a supercharging machine, comprising a pressure release device that is configured to, when a pressure in a region of an air-intake passage of the engine that is located upstream of a throttle valve in an intake-air flow direction exceeds a predetermined value, release the pressure from the air-intake passage.

In such a configuration, since the pressure release device releases the pressure so that the pressure in the region of the air-intake passage that is located upstream of the throttle valve, where the pressure is likely to increase, does not exceed the predetermined value, it is possible to suppress an excess pressure increase in the region of the air-intake passage that is located upstream of the throttle valve.

The pressure release device may be configured to, when the pressure in the region of the air-intake passage that is located upstream of the throttle valve in the intake-air flow direction with respect to a pressure in a region of the air-intake passage that is located downstream of the throttle valve in the intake-air flow direction exceeds a predetermined value, release the pressure in the region of the air-intake passage located upstream of the throttle valve outside the air-intake passage. In this case, by releasing the pressure based on a pressure difference between the pressure in the region located upstream of the throttle valve and the pressure in the region located downstream of the throttle valve, the pressure increase can be suppressed more correctly.

The region of the air-intake passage that is located upstream of the throttle valve in the intake-air flow direction, where the pressure is released by the pressure release device, may be located downstream of an intercooler in the intake-air flow direction. By releasing the pressure at this region, it is possible to suppress degradation of the pressure release device provided in the air-intake passage to release the pressure which may be caused by high-temperature air, because the air flowing in this region is cooled by the intercooler.

The pressure release device may be configured to release the pressure so that air in the air-intake passage is guided into a space in which a noise generated by the pressure release reduced. In such a configuration, in addition to the effect of suppressing the pressure increase, the noise generated by the pressure release can be effectively reduced.

The space in which the noise generated by the pressure release is reduced may be an inner space of an air box. Since the air box is used as the space to reduce the noise, there is no need to mount an additional component. In the personal watercraft equipped with such an air box, the noise generated by the pressure release can be reduced more effectively as compared to the configuration to release the air into, for example, an engine room.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the accompanying drawings. Throughout the embodiments, the same reference numerals are used to identify the same components, and will not be described repeatedly. As defined herein, directions are generally referenced from the perspective of an operator straddling the personal watercraft of FIG. 1. To be precise, the traveling direction of the personal watercraft is forward, except for a case specifically described.

Figure 1:
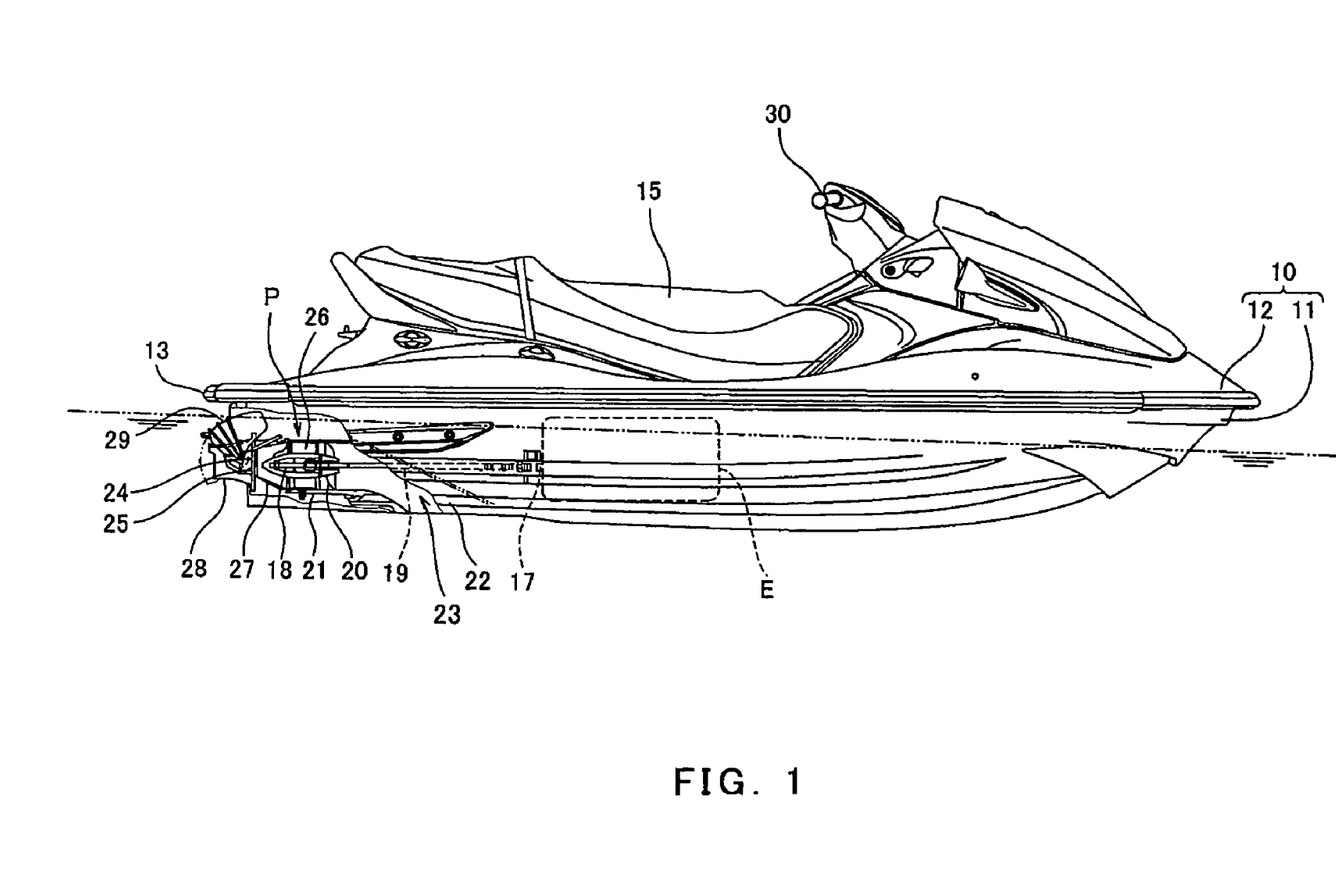
FIG. 1 is a side view of a personal watercraft according to an embodiment of the present invention.
Figure 2:
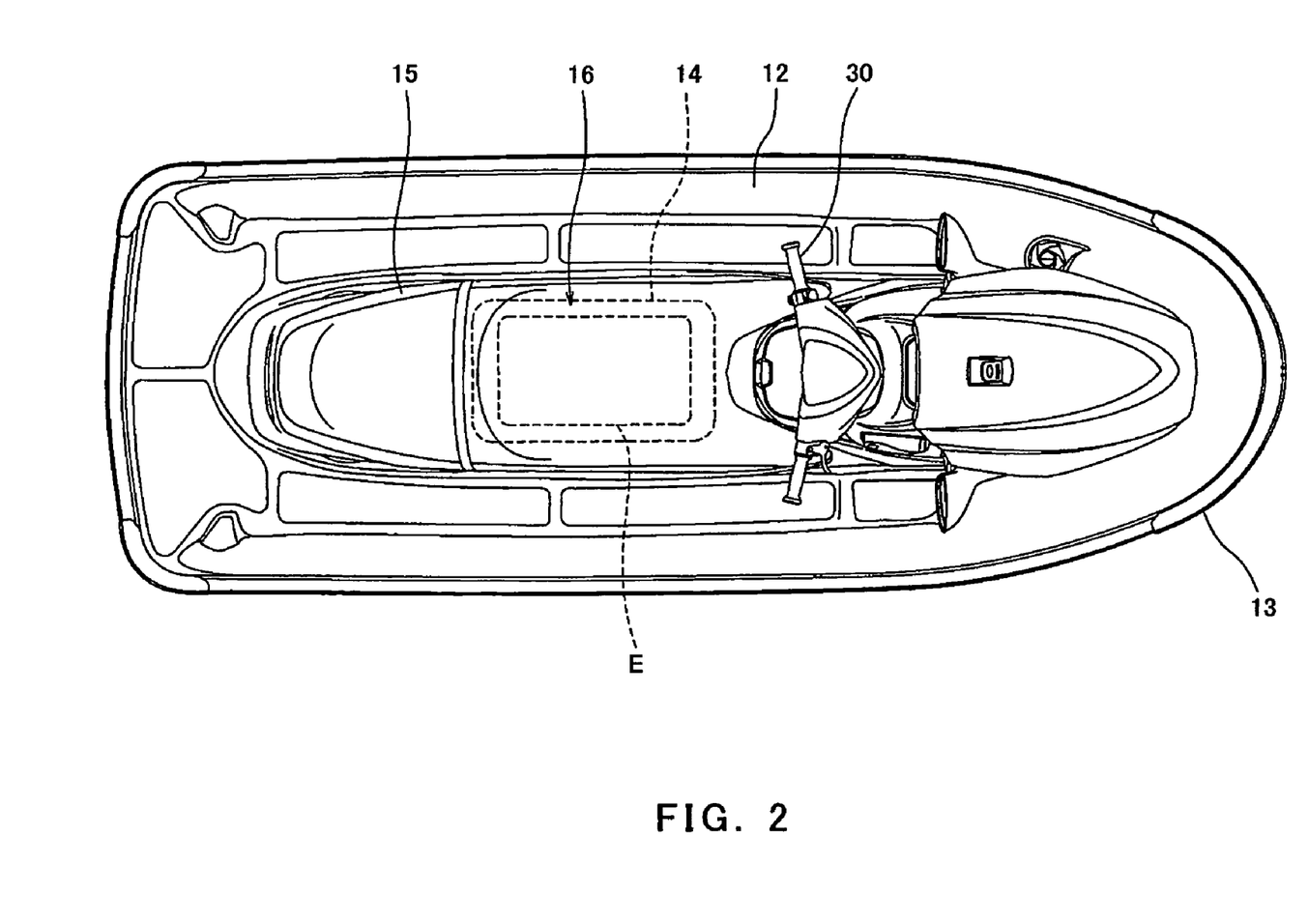
FIG. 2 is a plan view of the personal watercraft of FIG. 1.

FIG. 1 is a side view of a personal watercraft according to an embodiment of the present invention, and FIG. 2 is a plan view thereof. In the embodiments below, an engine and a pressure release device therefor of the present invention are applied to the personal watercraft, but the present invention is applicable to other vehicles such as a motorcycle, and an ATV (all terrain vehicle).

FIGS. 1 and 2, a body 10 of the personal watercraft includes a hull 11 and a deck 12 covering the hull 11 from above. The hull 11 and the deck 12 are joined to each other at a gunnel line 13. A substantially rectangular opening 14 is formed on an upper surface of the body 10 at a rear region of a center portion of the deck 12 so as to extend in a longitudinal direction of the body 10. The opening 14 is covered from above with a straddle-type seat 15 extending in the longitudinal direction. An engine E is mounted in an engine room 16 that is located below the seat 15 and is surrounded by the hull 11 and the deck 12.

As clearly shown in FIG. 1, a crankshaft 17 of the engine E extends rearward and a rear end portion of the crankshaft 17 is integrally and rotatably coupled to a pump shaft 18 of a water jet pump P through a propeller shaft 19. An impeller 20 is attached on the pump shaft 18 of the water jet pump P. The impeller 20 is covered with a cylindrical pump casing 21 on the outer periphery thereof.

A water intake 22 is provided on a bottom surface of the hull 11. The water is sucked from the water intake 22 and is fed to the water jet pump P through a water passage 23. The water jet pump P pressurizes and accelerates the water by the impeller 20. The water is ejected through a pump nozzle 27 having a cross-sectional area of flow that is gradually reduced rearward, and then from an outlet port 25 provided at a rear end thereof. As the resulting reaction, the watercraft obtains a propulsion force. Fairing vanes 26 serve to guide water flow behind the impeller 20.

As shown in FIGS. 1 and 2, a bar-type steering handle 30 is operative in association with a steering nozzle 28 that is mounted behind the pump nozzle 27 so as to be pivotable rightward or leftward around a pivot shaft (not shown). When the operator rotates the handle 30 clockwise or counterclockwise, the steering nozzle 28 is pivoted to steer the personal watercraft in a desired direction.

As shown in FIG. 1, a bowl-shaped reverse deflector 29 is mounted to an upper region of the steering nozzle 28 so as to be pivotable downward around a pivot shaft 24 horizontally mounted. The deflector 29 is pivoted downward behind the steering nozzle 28 to direct the water ejected rearward from the steering nozzle 28 forward, so that forward movement of the watercraft switches to rearward movement.

Subsequently, with reference to FIG. 3, the engine and a pressure release device equipped in an air-intake device of the engine according to the embodiment of the present invention will be described.

Figure 3:
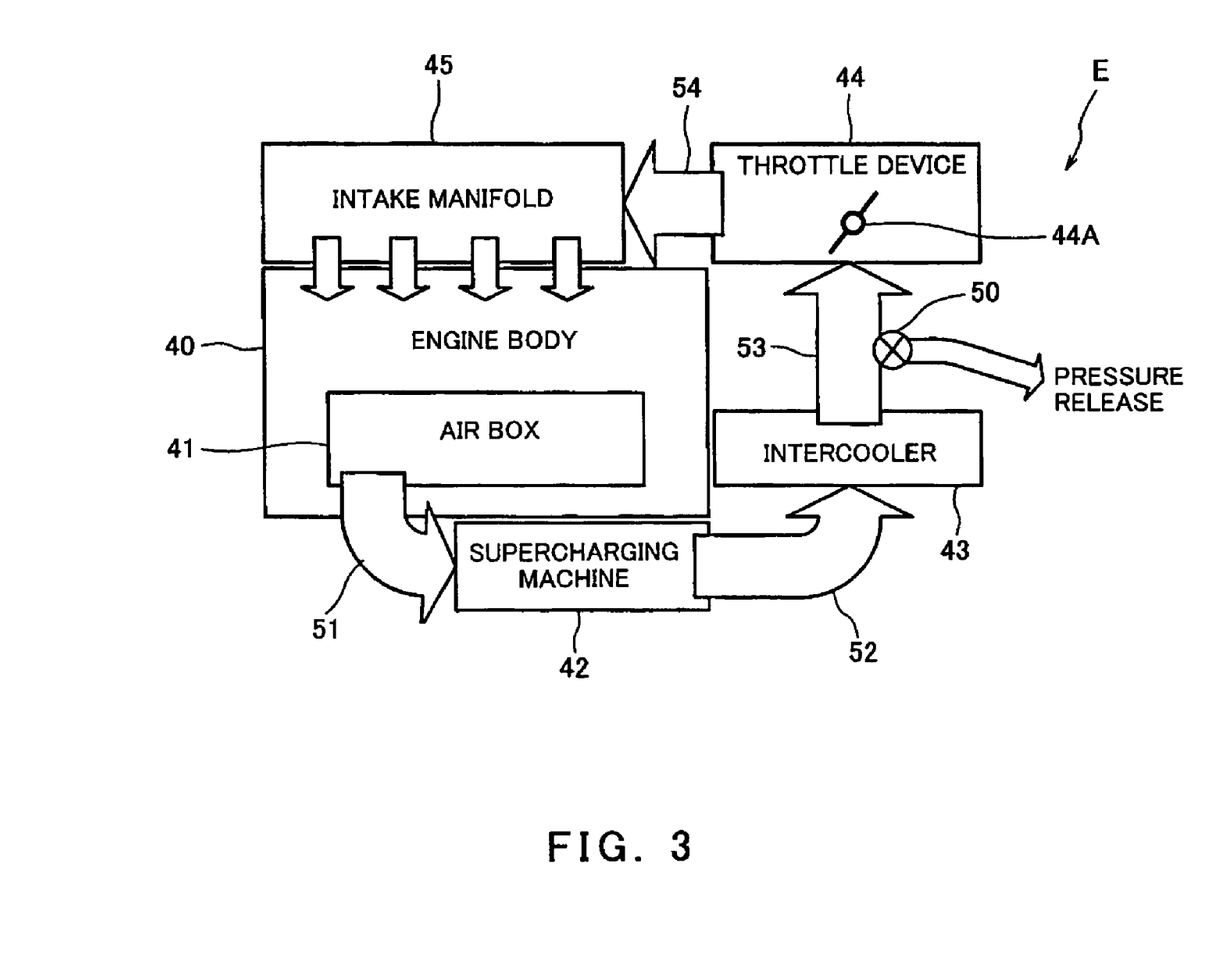
FIG. 3 is a view schematically showing a construction of a pressure release device of an engine equipped with a supercharging machine of FIG. 1.

As shown in FIG. 3, an air box (also referred to as an air-intake box) 41 configured to contain air taken in from outside and supplied to an engine E is mounted to the engine body 40. The air box 41 is provided with an air inlet (not shown) that opens downward on a bottom portion thereof so as to inhibit entry of water and other foreign matter. The air is introduced into the air box 41 through the air inlet and the water and foreign matter are removed from the air through a labyrinth structure (not shown) inside the air box 41. One end of an air-intake passage 51 is coupled to an air outlet of the air box 41. The engine body 40 includes a crankcase, a cylinder block, a cylinder head, a cylinder head cover, and other parts which are in turn coupled to each other from below.

An opposite end of the air-intake passage 51 is coupled to an air inlet of a supercharging machine 42 including a supercharger. The supercharging machine 42 actuates an internal pump (not shown) upon the start of the engine E to compress the air fed from the air box 41 through the air-intake passage 51, and feeds the compressed air to an intercooler 43. The supercharging machine 42 may comprise other machines such as a turbocharger.

One end of an air-intake passage 52 is coupled to an air outlet of the supercharging machine 42, and an opposite end of the air-intake passage 52 is coupled to an air inlet of an intercooler 43. The intercooler 43 cools the air having relatively high-pressure and high-temperature that is fed from the supercharging machine 42 through the air-intake passage 52. One end of an air-intake passage 53 is coupled to an air outlet of the intercooler 43. The air cooled in the intercooler 43 is fed to a throttle device 44 through the air-intake passage 53.

An opposite end of the air-intake passage 53 is coupled to an air inlet of a throttle device 44. The throttle device 44 includes a throttle valve 44A whose opening degree is controlled in association with an operation of a throttle lever attached to the steering handle 30 (FIG. 2), so that an amount of air fed from the intercooler 43 is controlled. One end of an air-intake passage 54 is coupled to an air outlet of the throttle device 44 so that the air with the amount controlled by the throttle device 44 is fed to an intake manifold 45 coupled to the throttle device 44 through the air-intake passage 54. The throttle device 44 may be a throttle body, a carburetor, or other component which are merely exemplary.

An opposite end of the air-intake passage 54 is coupled to an air inlet of the intake manifold 45. The intake manifold 45 is configured to distribute the air with the controlled amount that is fed from the throttle device 44 and to feed the air to a combustion chamber (not shown) of each cylinder of the engine body 40.

As shown in FIG. 3, in this embodiment, a pressure release valve 50 forming the pressure release device is provided in the air-intake passage 53 disposed between the intercooler 43 and the throttle device 44. The pressure release valve 50 is configured to move to an open position when the pressure in the air-intake passage 53 exceeds a predetermined value, thereby releasing the air in the air-intake passage 53 from the air-intake passage 53.

The above mentioned predetermined value of the pressure differs depending on the size, output and operating state of the engine E mounted in the watercraft. Nonetheless, it is desirable to determine the predetermined value so that a high pressure is not applied to the throttle device 44.

The pressure release valve 50 may be selected from a variety of valves such as a check valve and a diaphragm valve. Although not shown, the pressure in the air-intake passage 53 is detected by a sensor or other instrument and the pressure release valve 50 may be actuated to release the pressure using an electric device such as a solenoid according to the detected pressure.

In the manner as described above, an excess pressure increase in the air-intake passage 53 (52) that is located upstream of the throttle valve 44A in the intake-air flow direction can be suppressed.

Figure 4:
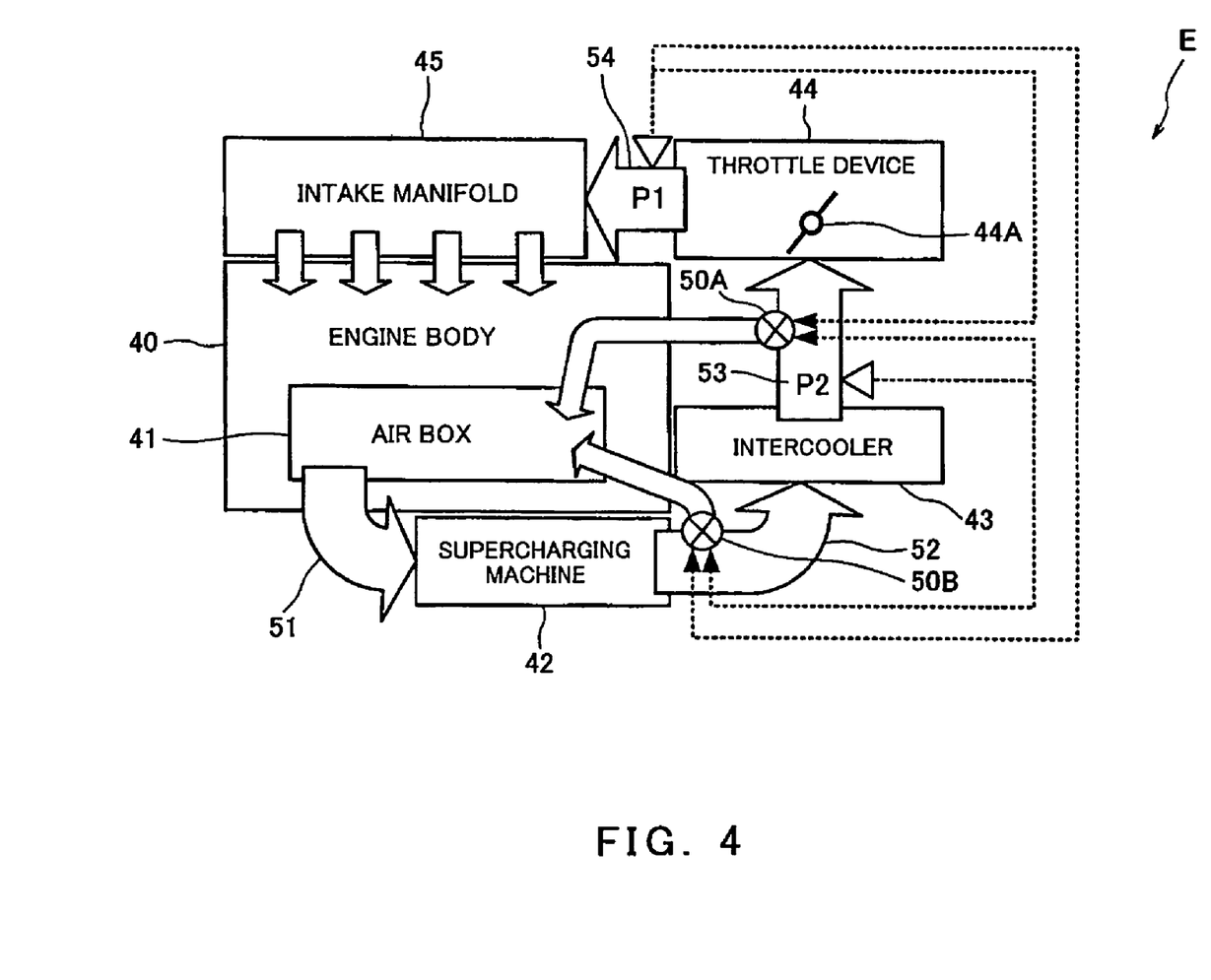
FIG. 4 is a view schematically showing another construction of the pressure release device of the engine equipped with the supercharging machine of FIG. 1.

FIG. 4 shows another construction of the engine and the pressure release device. In this embodiment, as the pressure release device, there are provided pressure release valves 50A and 50B that are configured to move to an open position to release the pressure when a pressure difference ΔP between a pressure (P1) in the air-intake passage 54 located between the throttle device 44 and the intake manifold 45 and a pressure (P2) in the air-intake passage 53 located between the intercooler 43 and the throttle device 44 becomes a predetermined value, for example, a value other than zero.

Whereas the pressure release valve 50 of FIG. 3 is configured to be actuated based on an absolute pressure, the pressure release valves 50A and 50B of FIG. 4 are capable of releasing the pressure correctly based on the pressure difference ΔP between the pressures P1 and P2.

Whereas in the embodiment of FIG. 4, the two pressure release valves 50A and 50B are disposed in the air-intake passages 53 and 52, respectively, one of them may alternatively be omitted. In that case, the pressure release valve 50A located downstream of the intercooler 43 is desirably provided, because air flowing in the air-intake passage 53 is cooled by the intercooler 43, and therefore degradation of durability of the pressure release valve 50A due to heat of the high-temperature air will not occur.

Furthermore, in the embodiment of FIG. 4, the air released by the two pressure release valves 50A and 50B is directed into an inner space of the air box 41 in order to effectively reduce the noise generated by the pressure release, rather than to outside the air-intake passage 53, for example, into an engine room 16 as shown in FIG. 3. The air box 41 is able to effectively reduce the noise because of its large space and its labyrinth structure as described above. As a matter of course, in the construction of FIG. 3, the air released by the pressure-release valve 50 may be directed into the space of the air box 41 as in the construction of FIG. 4.

The pressure release valves 50A and 50B may be selected from a variety of valves such as the check valve or the diaphragm valve. As a matter of course, the pressure P1 and the pressure P2 may be detected by sensors or other instruments, and the pressure release valves 50A and 50B may be actuated to release the pressure using the electric device such as the solenoid based on a pressure difference between these detected pressures.

Figure 5:
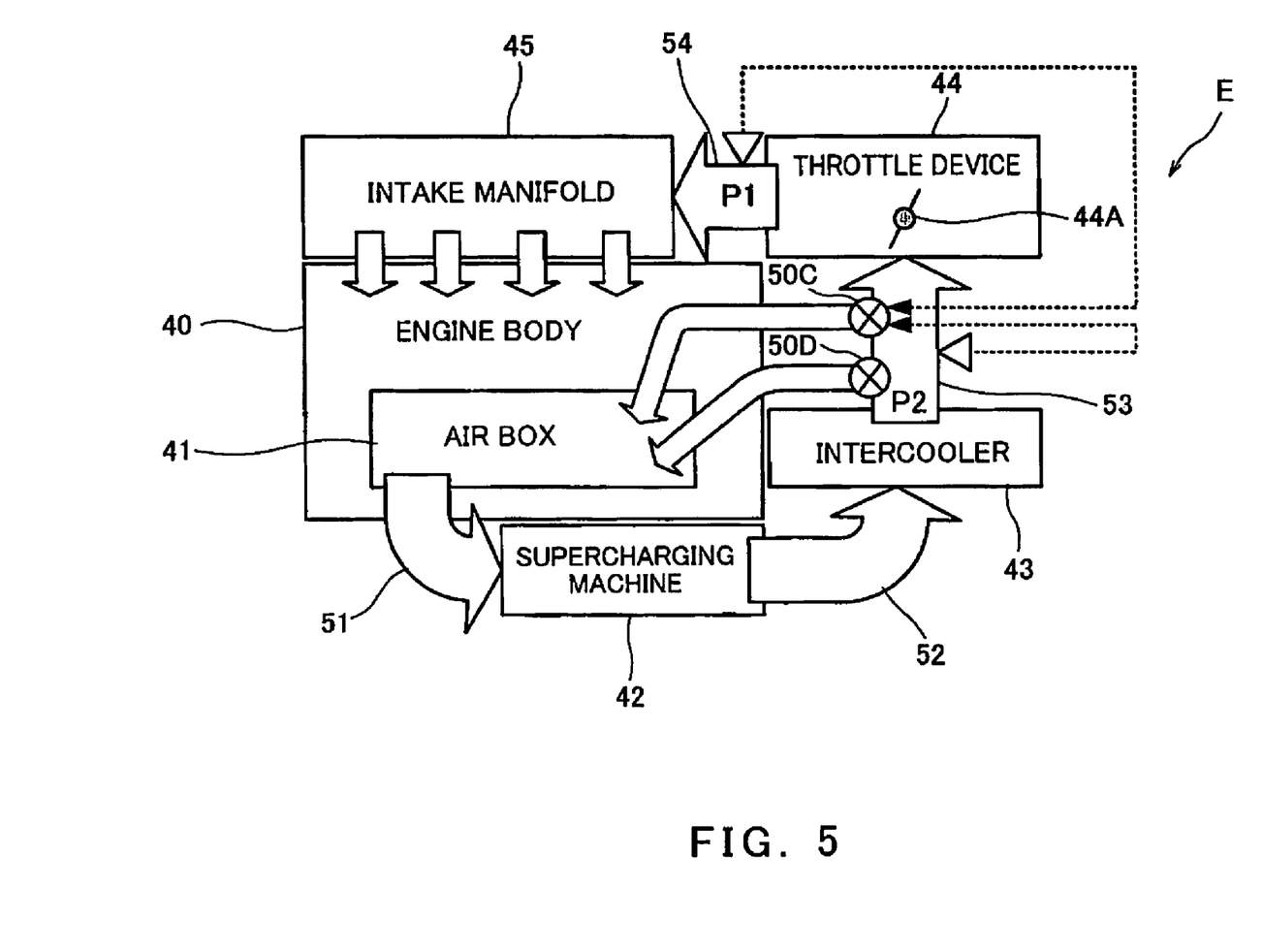
FIG. 5 is a view schematically showing another construction of the pressure release device of the engine equipped with the supercharging machine of FIG. 1.

FIG. 5 shows another construction of the engine and the pressure release device. In this embodiment, as the pressure release device, there are provided a pressure release valve 50C configured to move to an open position when the pressure difference ΔP between the pressure (P1) in the air-intake passage 54 located between the throttle device 44 and the intake manifold 45 and the pressure (P2) in the air-intake passage 53 located between the intercooler 43 and the throttle device 44 becomes a predetermined value, for example, a value other than zero, and a pressure release valve 50D configured to move to an open position when the pressure in the air-intake passage 53 exceeds a predetermined value in such a manner that the pressure release valves 50C and 50D are located between the intercooler 43 and the throttle device 44.

In this embodiment, since the pressure release valve 50C is actuated based on the difference between the pressures P1 and P2, and the pressure release valve 50D is actuated based on the absolute pressure, the pressure can be released with higher precision. In addition, since both of the pressure release devices 50C and 50D are located downstream of the intercooler 43, they are not exposed to the high-pressure and high-temperature air fed from the supercharging device 42. As a result, durability of the valves 50C and 50D will not be substantially degraded.

Furthermore, in the embodiment of FIG. 5, the air released by the two pressure release valves 50C and 50D is directed into the space of the air box 41 in order to effectively reduce the noise generated by the pressure release. The air box 41 is able to effectively reduce the noise generated by the air pressure because of its large space and its labyrinth structure as described above.

The pressure release valves 50C and 50D may be selected from a variety of valves such as the check valve or the diaphragm valve. As a matter of course, the pressure P1 and the pressure P2 may be detected by sensors and other instruments, and the pressure release valves 50A and 50B may be actuated to release the pressure using the electric device such as the solenoid based on the pressure difference between these detected pressures.

With reference to FIGS. 6 to 9, the engine E will be described. The engine E is constructed in such a manner that the air box 41 is attached to an upper region of the engine body 40, to be precise, an upper surface of the cylinder head (not shown). The air box 41 has a substantially box shape and is disposed to cover a substantially entire region of an upper surface of the engine body 40. The air box 41 is provided with the air inlet (not shown) on the bottom portion thereof (engine body 40 side). The air box 41 is provided with the air outlet that opens on a left side surface of a front portion thereof. The air outlet of the air box 41 is connected to the air-intake passage 51 formed of a flexible pipe member. The air-intake passage 51 is bent downward and then backward, and its rear end is coupled to the air inlet formed on the lower surface of the supercharging machine 42, which is the supercharger in this embodiment. Instead of the supercharger, a turbo charger may be mounted as the supercharging machine 42.

The supercharging machine 42 is mounted to a left side surface of a rear portion of the engine body 40. An exhaust manifold 46 is mounted above the supercharging machine 42. The supercharging machine 42 is configured such that an input shaft 421 thereof extending rearward is coupled to the crankshaft 47 via a belt and pulley mechanism 422. In this construction, when the crankshaft 47 rotates upon the start of the engine E, the rotation is transmitted to the input shaft 421 of the supercharging machine 42 via the belt and pulley mechanism 422. According to the rotation of the input shaft 421, the supercharging machine 42 causes the internal pump (not shown) to be actuated to compress the air fed from the air box 41 through the air-intake passage 51, and feeds the compressed air to the intercooler 43.

The supercharging machine 42 is provided with the air outlet formed on an upper portion thereof. One end of the air-intake passage 52 is coupled to the air outlet of the supercharging machine 42, and an opposite end thereof is coupled to the air inlet of the intercooler 43.

The intercooler 43 is of a thin box-shape in which its thickness direction is oriented horizontally. The intercooler 43 is disposed behind the engine body 40 to be tilted with respect to the longitudinal direction of the body 10 from the right to the left in a rearward direction as viewed from above. The intercooler 43 is provided with the air inlet formed on an end surface thereof oriented rightward and forward. The intercooler 43 cools the air fed from the supercharging machine 42 through the air-intake passage 52 and feeds the cooled air to the throttle device (herein, throttle body) 44 through the air-intake passage 53. In this embodiment, the intercooler 43 is provided with the air outlet formed on the end surface where its air inlet is formed. One end of the air-intake passage 53 is coupled to the air outlet of the intercooler 43 and an opposite end thereof is coupled to the air inlet of the throttle body 44.

The throttle body 44 is disposed adjacent the air inlet of the intake manifold 45 and serves to control the amount of the air fed from the intercooler 43 and to feed the air to the intake manifold 45 connected to the throttle body 44.

The intake manifold 45 extends on a right side of the upper region of the engine body 40 over substantially the entire length in the longitudinal direction. The intake manifold 45 is configured to distribute the air with the controlled amount that is fed from the throttle device 44 coupled to a rear end portion of the intake manifold 45 and to feed the air to the combustion chamber (not shown) of each cylinder through an intake port (not shown) of the cylinder head.

After combustion, an exhaust gas gathers to the exhaust manifold 46 through an exhaust port (not shown) of the cylinder head. The intake manifold 46 extends on a left side of the upper region of the engine body 40 over substantially the entire length in the longitudinal direction. One end of an exhaust passage 461 formed by a flexible pipe is coupled to a rear end portion of the exhaust manifold 46. An opposite end of the exhaust passage 461 is bent downward to be coupled to a first water muffler 47L mounted on a left side behind the engine body 40. The first water muffler 47L is coupled through an exhaust passage 462 formed by a flexible pipe to a second water muffler 47R disposed on the right side behind the engine body 40.

Thereby, the exhaust gas gathering to the exhaust manifold 46 is delivered to the first water muffler 47L through the exhaust passage 461, and then to the second water muffler 47R through the exhaust passage 462. Finally, the exhaust gas is discharged outside the watercraft through an exhaust passage 463 extending from the second water muffler 47R.

In this embodiment, a front end of the second water muffler 47R is positioned behind a front end of the first water muffler 47L to form a space in front of the second water muffler 47R. In this space, a front portion of the intercooler 43 disposed to be tilted in the manner as described above is accommodated.

Figure 6:
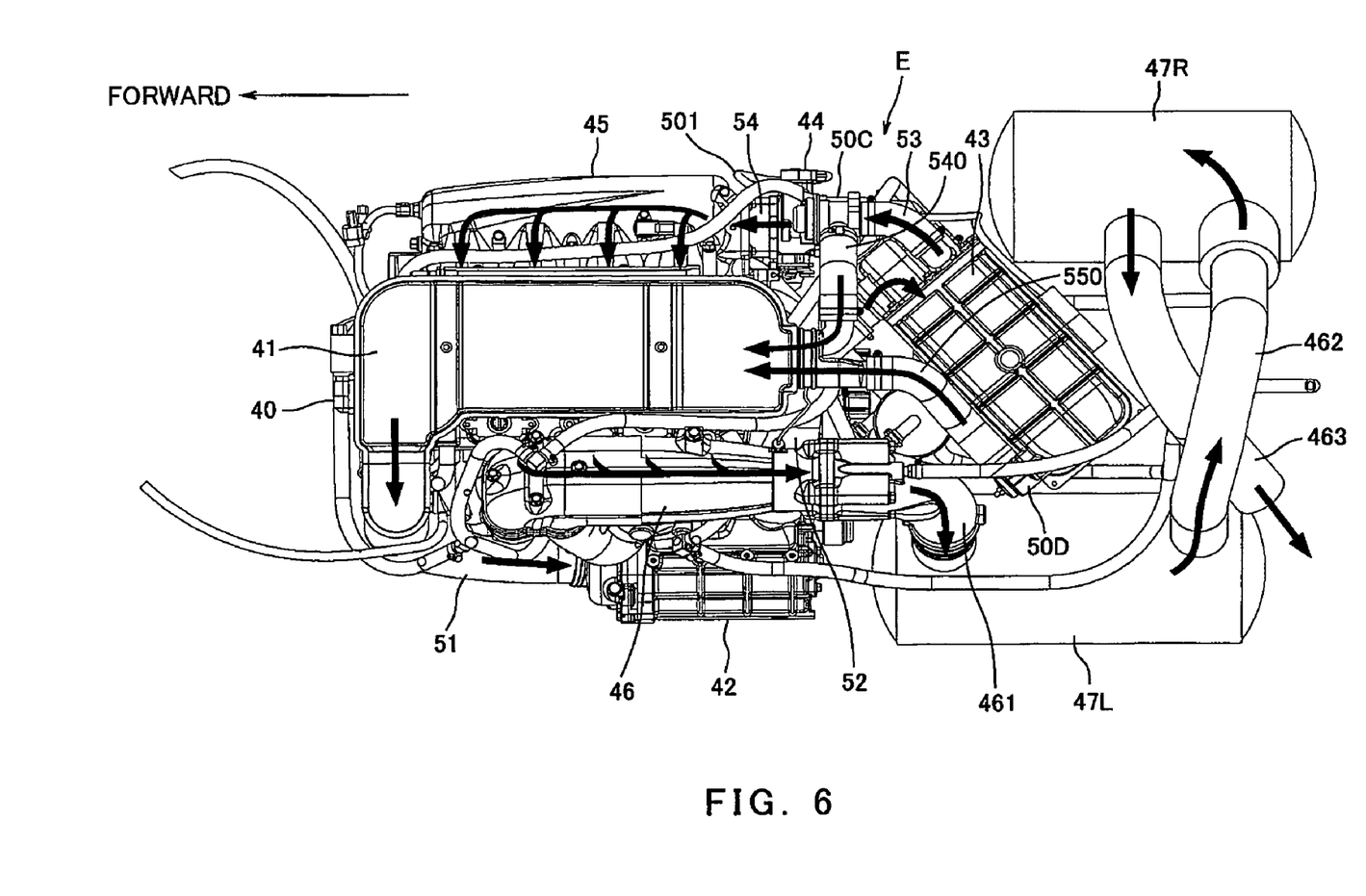
FIG. 6 is a plan view of the engine and the pressure release device therefor of FIG. 5.
Figure 7:
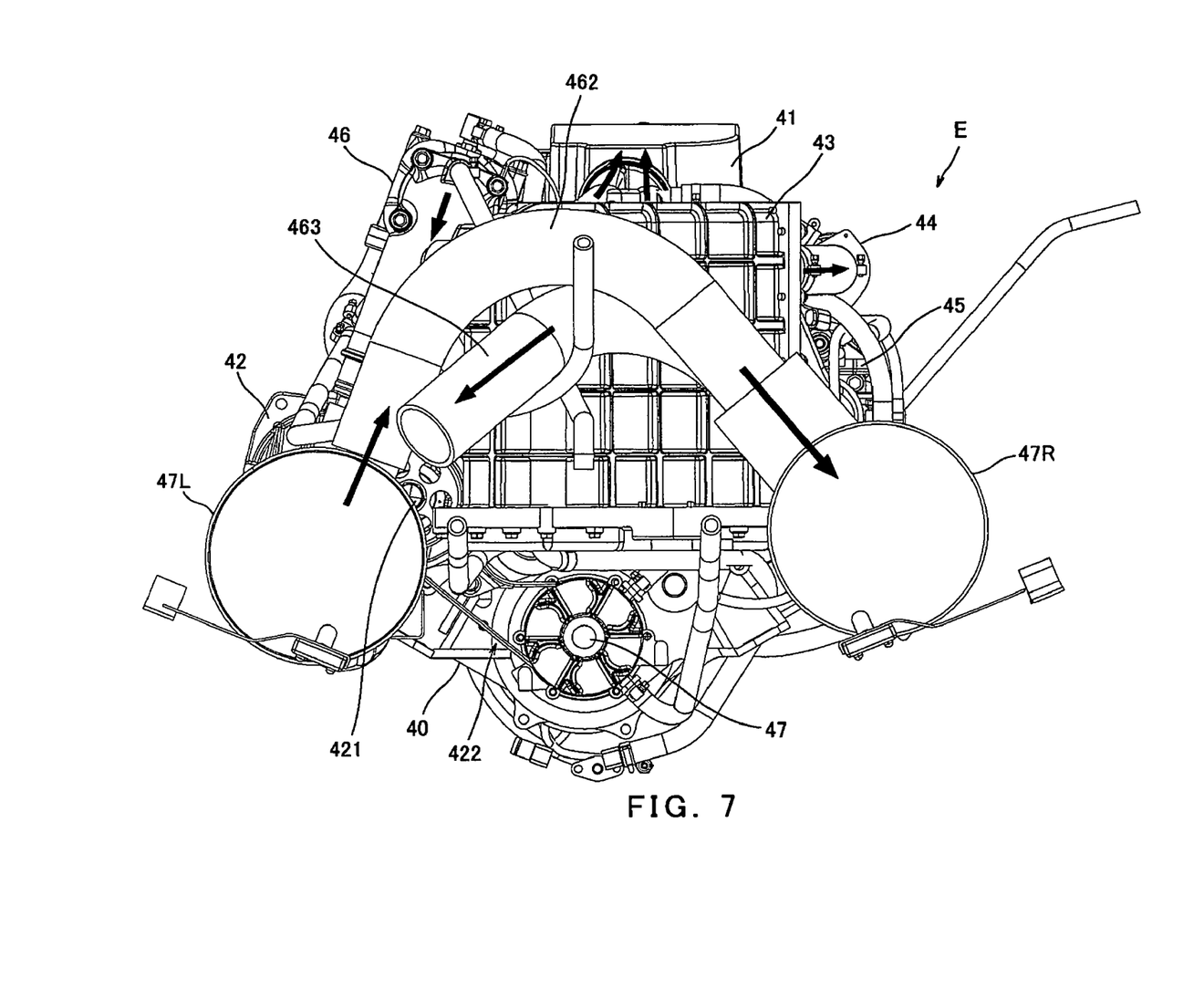
FIG. 7 is a rear view of the engine and the pressure release device therefor of FIG. 6.
Figure 8:
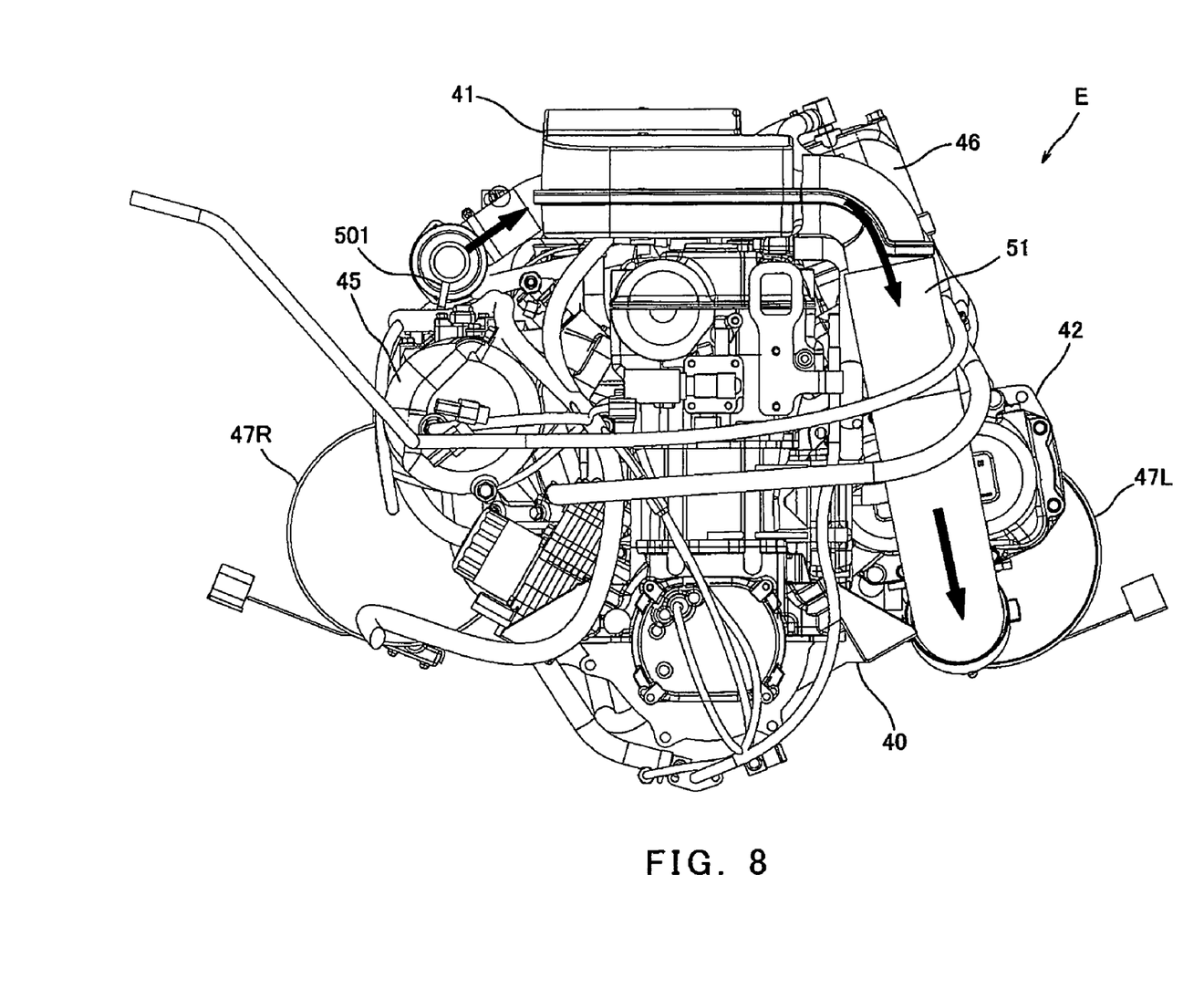
FIG. 8 is a front view of the engine and the pressure release device therefor of FIG. 6.
Figure 9:
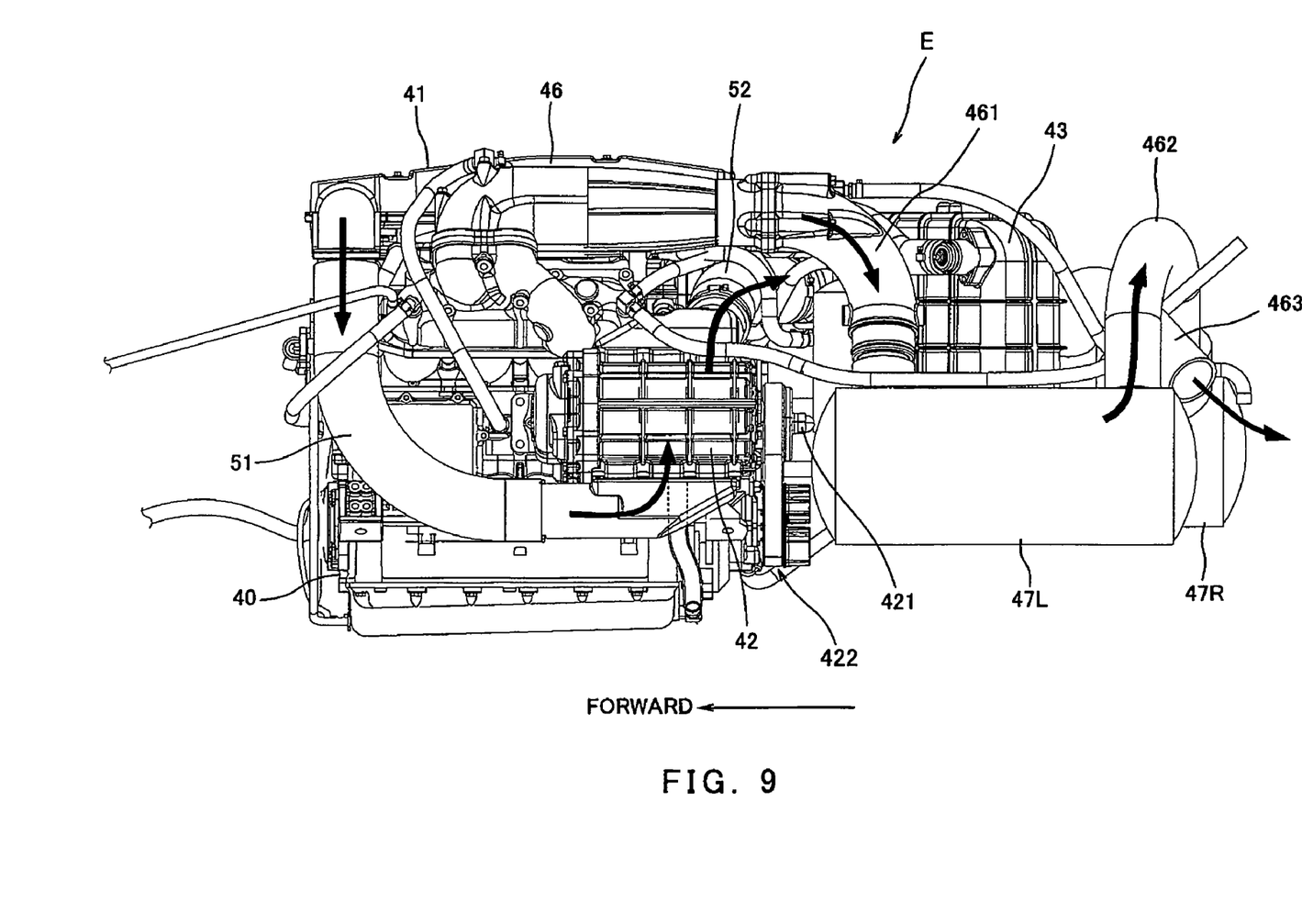
FIG. 9 is a left side view of the engine and the pressure release device therefor of FIG. 6.

In this embodiment, as can be clearly shown in FIG. 6, the pressure release valve 50D is provided in the intercooler 43 and the pressure release valve 50C is provided between the intercooler 43 and the throttle device 44.

One end of a guide pipe 501 is coupled to the air-intake passage 54 disposed between the throttle device 44 and the intake manifold 45, and an opposite end thereof is coupled to the pressure release valve 50C.

In such a construction, the pressure (P1) in the air-intake passage 54 between the throttle device 44 and the intake manifold 45 and the pressure (P2) in the air-intake passage 53 between the intercooler 43 and the throttle device 44 are applied to the pressure release valve 50C. The pressure release valve 50C is, for example, the diaphragm valve, and is configured to move to the open position when the pressure difference ΔP is generated between the pressures P1 and P2. In contrast, the pressure release valve 50D is configured to move to the open position when the pressure in the air-intake passage 53 reaches, for example, 1.8 bar.

One end of guide pipes 540 and 550 are coupled to the pressure release valves 50C and 50D, respectively, and opposite ends thereof are coupled to a rear end surface of the air box 41.

As should be appreciated from the above, the air released by the pressure release valve 50C configured to be actuated when the pressure difference ΔP becomes the predetermined value (e.g., zero) or higher and the air released by the pressure release valve 50D configured to be actuated when the pressure in the air-intake passage 53 exceeds the predetermined value, are directed into the space of the air box 41 so that the pressure increase in the air-intake passages 53 and 54 is suppressed and the noise generated by the air pressure is effectively reduced.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An engine for a personal watercraft that is equipped with a supercharging machine, comprising:

a first pressure release device that is configured to, when a pressure measured by an upstream pressure sensor positioned in a region of an air-intake passage of the engine that is located upstream of a throttle valve in an intake-air flow direction exceeds a predetermined value, release the pressure outside the air-intake passage; and a second pressure release device that is configured to, when the pressure measured by the upstream pressure sensor positioned in the region of the air-intake passage that is located upstream of the throttle valve in the intake-air flow direction exceeds a pressure in a region of the air-intake passage that is located downstream of the throttle valve in the intake-air flow direction, release the pressure in the region of the air-intake passage located upstream of the throttle valve outside the air-intake passage.

2. The engine for a personal watercraft, according to claim 1, wherein the first and second pressure release devices are configured to release the pressure so that air in the air-intake passage is guided into an air box configured to contain air taken in from outside and supplied to the engine in which a noise generated by the pressure release is reduced.

3. A personal watercraft comprising:

an engine including:

a first pressure release device that is configured to, when a pressure measured by an upstream pressure sensor positioned in a region of an air-intake passage of the engine that is located upstream of a throttle valve in an intake-air flow direction exceeds a predetermined value, release the pressure outside the air-intake passage; and a second pressure release device that is configured to, when the pressure measured by the upstream pressure sensor positioned in the region of the air-intake passage that is located upstream of the throttle valve in the intake-air flow direction exceeds a pressure in a region of the air-intake passage that is located downstream of the throttle valve in the intake-air flow direction, release the pressure in the region of the air-intake passage located upstream of the throttle valve outside the air-intake passage.

* * * * *